Jan. 27, 1970   C. R. MUELLER   3,492,033
CLEVIS ASSEMBLY
Filed Sept. 18, 1968
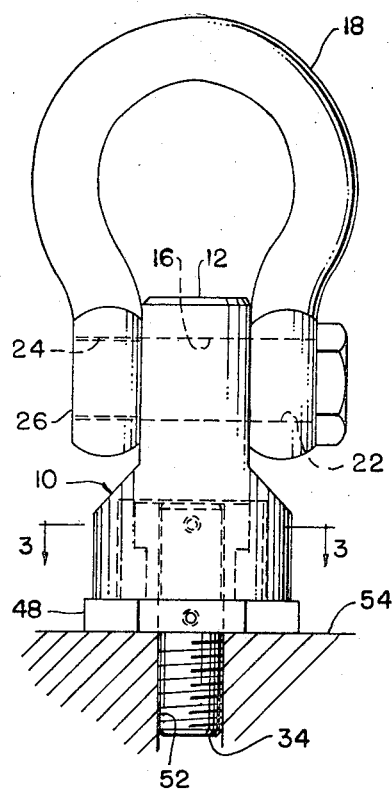
FIG.1
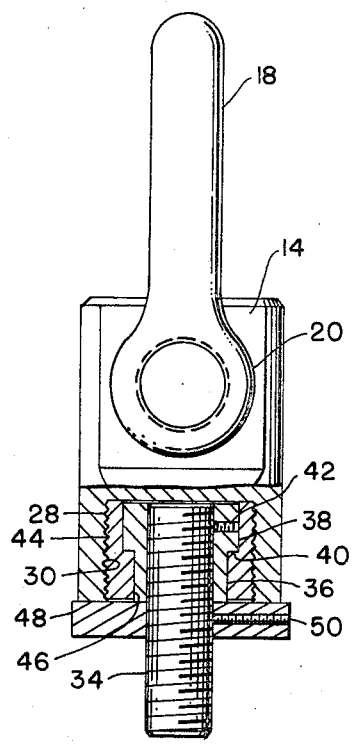
FIG.2
FIG.3
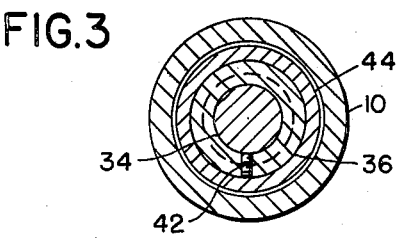
INVENTOR
CHARLES R. MUELLER
BY Whittemore, Hulbert & Belknap
ATTORNEYS United States Patent Office 3,492,033
Patented Jan. 27, 1970

3,492,033
CLEVIS ASSEMBLY
Charles R. Mueller, Gross Pointe Woods, Mich., assignor to Charles R. Mueller & Sons, Inc., Detroit, Mich., a corporation of Michigan
Filed Sept. 18, 1968, Ser. No. 760,559
Int. Cl. F16c *11/00;* B25g *3/38*
U.S. Cl. 287—91          3 Claims

ABSTRACT OF THE DISCLOSURE

A clevis body has a deep recess threaded to full depth, receiving a retainer ring threaded to be engaged in the recess for its full depth. A stud, having a shoulder at its top is rotatably engaged by said ring, and carries a lock nut.

BRIEF SUMMARY OF THE INVENTION

A clevis assembly comprises a clevis body having a shackle pivoted at one end thereof and having a relatively deep threaded recess at its opposite end. Received in the recess is an externally threaded elongated nut the inner end of which seats against the bottom of the recess. The nut is provided with a radially inwardly projecting load supporting shoulder. A stud is provided with a load support shoulder at one end which is received in the recess and which is rotatably engaged by the load supporting shoulder of the nut. The stud has an outer threaded end adapted to be screwed into a threaded recess in a part to be lifted and is further provided with a lock nut to lock the clevis assembly against the part to be lifted.

Preferably, the shoulder at the inner end of the stud is provided by an internally threaded tubular element having a length substantially equal to the length of the nut so that a relatively great length of threaded engagement is provided for the parts transmitting the weight of the lifted article to the shackle. At the same time, free rotation of the clevis body about the axis of the stud is permitted.

BRIEF DESCRIPTION OF THE DRAWING

FIGURE 1 is a side elevational view of the clevis assembly shown attached to an article to be lifted.

FIGURE 2 is a side elevational view of the clevis body with parts broken away.

FIGURE 3 is a sectional view on the line 3—3, FIGURE 1.

DETAILED DESCRIPTION

The clevis body 10 has a flattened upper portion 12 provided with opposed flat side walls 14 having a cylindrical opening 16 extending therethrough. A shackle 18 has enlarged ends 20 one of which is apertured as indicated at 22, and the other of which has a threaded aperture as indicated at 24. A pivot bolt 26 extends through the openings 16 and 22 and has a threaded end engaged in the threaded opening 24.

The opposite end of the clevis body 10 is provided with a relatively deep recess 28 provided with threads 30 and a substantially flat inner wall, as shown in FIGURE 2. A threaded stud 34 is provided having at its inner end a nut 36 threaded thereto for a distance substantially equal to the depth of the recess 28. The nut 36 is provided at its top with an annular radially outwardly extending annular flange 38 providing a shoulder 40. The nut 36 has its upper end substantially coplanar with the inner end of the stud 34 and is fixed thereto by a set screw 42.

To retain the stud and nut 36 in assembly with the clevis body there is provided a support ring 44 having its external surface threaded throughout its length and engaged with the threaded surface 30 of the recess 28. The ring 44 at its lower or outer end has a radially inwardly extending flange 46 which forms an upwardly facing shoulder engageable with the shoulder 40 on the nut 36.

Theaded onto the stud 34 is a lock nut 48 which is fixed thereto by a set screw 50.

Preferably, the radially inwardly extending flange 46 of the ring 44 and the radially outwardly extending flange 38 of the nut 36 have substantially equal axial dimensions each being substantially equal to one-half of the depth of the threaded recess 28 provided in the clevis body 10. This arrangement provides maximum strength between the retainer ring and nut. Also, it is to be observed that the threaded connection between the ring 44 and the clevis body, and the threaded connection between the nut 36 and the stud 34 are each of a dimension substantially equal to the full depth of the recess 28. This arrangement provides maximum strength of the connections adapted to transmit weight from the lifted article to the shackle 18.

In order to provide for relatively free rotation of the clevis body and shackle about the axis of the stud 34, the parts are dimensioned so that when the inner end of the retainer ring 44 is seated against the bottom or inner wall of the recess 28, the inner end of the nut 36 has clearance with respect to the bottom wall of the recess.

While the flange 38 is illustrated as provided on a nut 36, it will be understood that if desired the stud 34 could be in the form of a headed bolt, the head thereof serving the same purpose as the flange 38.

If desired, a stud may be provided to extend through the side wall of the recess 28 into engagement with the retainer ring 44.

In use, the clevis assembly is rotated to screw the stud 34 into a threaded recess 52 in the article 54 which is to be lifted. After the parts have reached the approximate position illustrated in FIGURE 1, the lock nut 48 may be tightened to firmly lock the stud, the nut 36, as well as the nut 48 into tightly assembly relation with the article 54. At this time the sub-assembly comprising the clevis body 10, the shackle 18, and the retainer ring 44 is rotatable about the fixed sub-assembly of the stud and nuts 36 and 48. At the same time, the depth of the recess 28 providing equal length of the threaded surfaces of the nut 36 and ring 44, provides for maximum strength of the clevis.

The drawing and the foregoing specification constitute a description of the improved clevis assembly in such full, clear, concise and exact terms as to enable any person skilled in the art to practice the invention, the scope of which is indicated by the appended claims.

What I claim as my invention is:

1. A clevis assembly comprising a clevis body having a shackle pivoted thereto and also having a deep threaded recess, an annular retainer ring threaded in said recess for its full depth and having an internal inwardly extending annular load support flange at its outer end, and a stud having one end extending into said recess and having a nut threaded to its inner end for substantially the full depth of said recess, said nut having an external outwardly extending annular load support flange thereon engaged by the flange on said ring, the width of said flanges measured in the direction of the axis of said stud being substantially equal and each equal approximately to one-half the depth of said recess, said clevis body and ring being rotatable relative to said stud.

2. A clevis assembly as defined in claim 1 comprising a lock nut threaded to the portion of said stud exteriorly of said recess.

3. A clevis assembly as defined in claim 1 in which the said flanges are dimensioned such that when said ring is seated against the bottom of said recess, the flange on said nut has clearance to provide for swivelling movement of said clevis body and shackle about the axis of said stud when the stud is screwed fully into a threaded recess in an article to be lifted.

References Cited

UNITED STATES PATENTS

| | | | |
|---|---|---|---|
| 931,270 | 8/1909 | Clarkson | 59—95 |
| 1,516,891 | 11/1924 | Pridgen | 287—91 |
| 2,097,465 | 11/1937 | Morrison | 59—86 |
| 2,246,588 | 6/1941 | Harrall | 287—91 XR |
| 2,507,849 | 5/1950 | Bland | 285—281 |
| 3,270,494 | 9/1966 | Holmes | 59—86 |
| 3,362,671 | 1/1968 | Johnson | 287—91 XR |

FOREIGN PATENTS 1,335,911  7/1963  France.

DAVID J. WILLIAMOWSKY, Primary Examiner

ANDREW V. KUNDRAT, Assistant Examiner

U.S. Cl. X.R.

59—95; 294—82